United States Patent [19]

Morrissey

[11] Patent Number: 4,790,507
[45] Date of Patent: Dec. 13, 1988

[54] TOOL FOR THE PRECISE MOVEMENT OF MACHINES

[76] Inventor: Brian J. Morrissey, 1911 Landry Dr., Baker, La. 70714

[21] Appl. No.: 50,962

[22] Filed: May 18, 1987

[51] Int. Cl.$^4$ ............................................. F16M 13/00
[52] U.S. Cl. ...................................... 248/651; 269/235
[58] Field of Search .......................... 72/482; 81/484; 74/571 M; 248/651, 674, 657; 33/645, 568, 569, 570; 269/66, 232, 233, 234, 235; 29/244

[56] References Cited

U.S. PATENT DOCUMENTS

| | | | |
|---|---|---|---|
| 449,039 | 3/1891 | Fietsch, Jr. | 269/235 |
| 722,677 | 3/1903 | Crippen et al. | 269/233 |
| 3,158,045 | 11/1964 | Siler | 33/645 |
| 3,692,268 | 9/1972 | Laughlin | 269/66 |
| 4,498,328 | 2/1985 | Nagakura | 72/482 |

Primary Examiner—Lowell A. Larson

[57] ABSTRACT

A tool for the controlled, precise movement in the horizontal plane, for machines such as electric motors, gear boxes, compressors and the like, for the purpose of achieving an accurate alignment between two or more machines.

The tool, comprising of a body (1) having a rotatable circular member (2) engaged in a hole (6) in said body (1). Said body (1) having a lip (3) to contact a machine foot, and being adjustable by a screw (4).

Said circular member (2) having an off set fulcrum (8), rotation of said circular member (2) around said off set fulcrum, causes longitudinal movement of said body (1) being in contact with a machine, moves said machine a longitudinal amount as a ratio of rotational movement.

3 Claims, 1 Drawing Sheet

TOOL FOR THE PRECISE MOVEMENT OF MACHINES

FIELD OF THE INVENTION

This invention relates to the precise movement of machines such as electric motors, gear boxes and the like, to position the machine to achieve an accurate alignment in the horizontal plane, between two or more machines.

BACKGROUND OF THE INVENTION

To achieve an accurate alignment between two machines such as an electric motor directly coupled to a driven machine requires movement of the electric motor to within 0.001" or closer in the vertical and horizontal planes.

When the position of the motor relative to its driven machine are established, the alignment in the vertical plane is achieved by raising the motor to add or subtract metal shims. The raising or lifting of the motor is not critical, as its correct alignment position is established by the shims. Lowering the motor on to the shims achieves accurate alignment in the vertical plane.

In the horizontal plane however, any movement is critical. Heretofore the most common method used to achieve horizontal alignment was by using a heavy hammer or heavy metal 'bumping' bar to tap the motor in the direction required. As little control can be exercised over the force of the blow, or the sliding friction of the motor, this method results in a too little—too much trial and error movement, requiring many moves before an alignment or compromise position is reached, involving much time and patience on the part of the mechanical doing the alignment.

In certain circumstances when the construction of the machine base is suitable, another method of horizontal movement may be used. This involves fabricating metal lugs, drilled and tapped to accept a jackbolt, and welding these lugs adjacent to each foot of the motor. The jackbolt is screwed to contact the edge of the foot and push the motor in the direction required.

The jackbolt threads in contact with the foot distort as the jackbolt is turned, and in some cases the jackbolt will bend, making removal difficult if not impossible. Left in position the lugs and jackbolts are subject to deterioration making them unusable the next time motor movement is required, as a result they have to be removed and replaced. Lugs and jackbolts have to be made and fitted to each piece of equipment that is suitable for this method of movement. This method is costly and time consuming.

OBJECTS OF THE INVENTION

Accordingly the benefits of this invention will provide a portable, quick, easy method to move a machine in a controlled precise manner to achieve an accurate alignment while being adjustable to suit a range of machine sizes.

A further benefit is a scale or index for measuring the amount of movement made.

Further objects and advantages of my invention will become apparent from a consideration of the drawings and ensuing description thereof.

Figure 2:
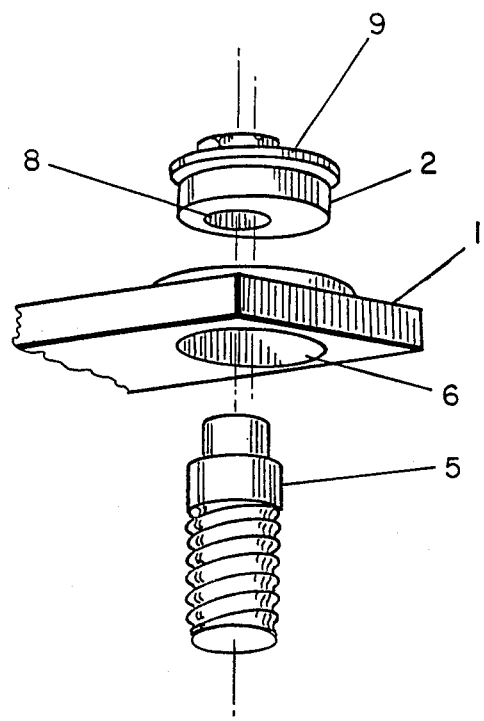
Figure 1:
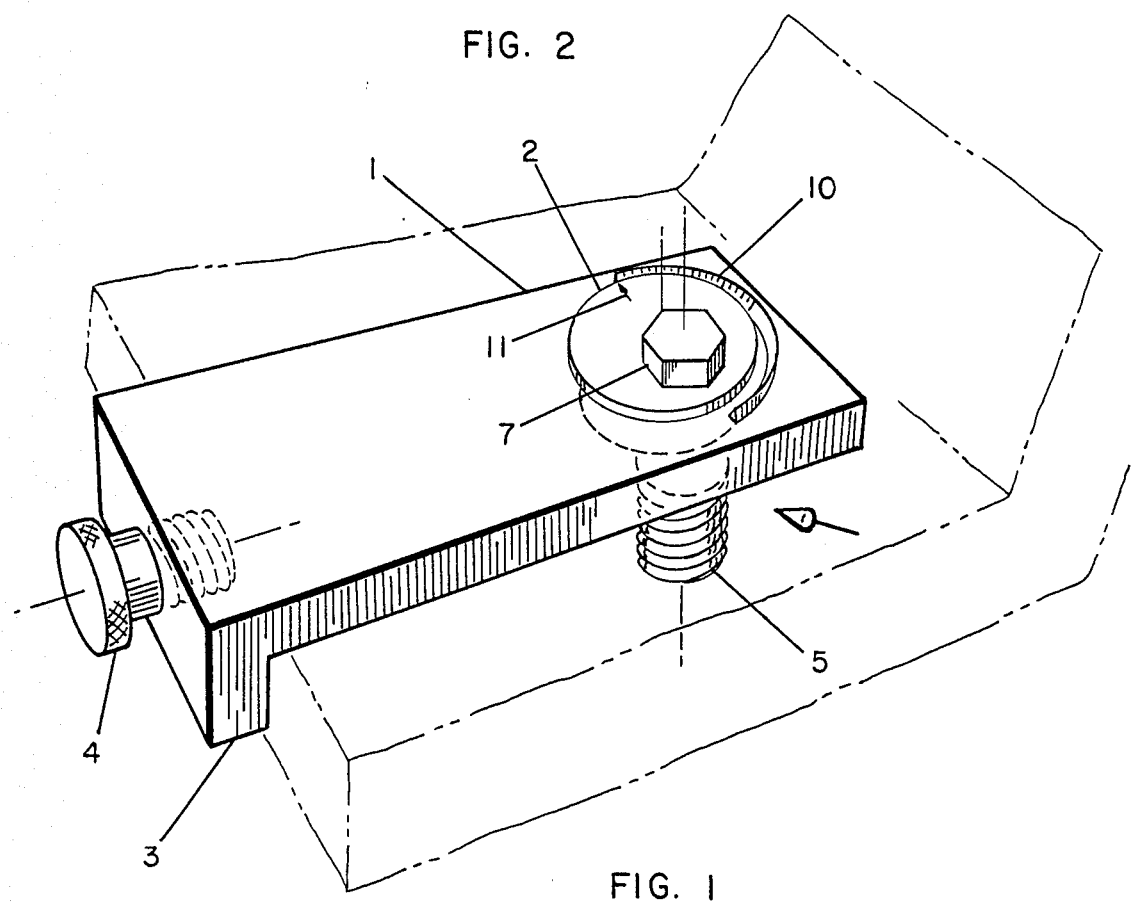
FIG. 1 is a perspective view of the tool showing the body (1) including lip (3) and adjustable screw (4), assembled in an operating mode over a machine foot (phantom view).

Circular member (2) is shown in its position engaging shaft or journal (5) in hole (8) and being engaged in hole (6) in body (1), supported by flange (9). Major axis on circular member (2) is indicated by relative position of mark (11) to scale or index (10) on body (1). Also shown is hexagonal part (7) enabling circular member (2) to be rotated using a wrench.

FIG. 2 is an exploded view showing the off set hole (8) in circular member (2), and flange (9), and the relative position of parts for assembly, being body (1) circular member (2) shaft or journal (5).

DESCRIPTION OF THE PREFERRED EMBODIMENT

A tool for the precise movement of machines comprising. A body comprising of a longitudinal member (1) having a hole (6) at one end, and having a flange or lip (3) at the other.

Said flange or lip having a threaded hole centrally located and having a bolt or screw (4) threaded into said hole.

A circular member (2) having at its upper side a means of engaging with a mechanical device (7) for rotating said circular member (2) and having a flange (9).

At its lower side said circular member (2) has a hole (8) or means of providing a fulcrum, off set from its geometric center.

Said circular member (2) is engagable in said hole (6) in said body (1), being supported by flange (9).

A shaft or journal (5) having a portion threaded for engaging a threaded hole, and another portion forming a collar or fulcrum, engagable in said hole (8) of said circular member (2).

OPERATION

Having established the amount and direction of movement required to effect an accurate alignment of a machine, the bolt securing a machine foot is removed and replaced by the shaft or journal (5), threading into the machine sub base, and having clearance in the hole in the machine foot, the shaft or journal (5) extends above the top of the foot.

The body (1) is now placed over the foot in a way that shaft or journal (5) protrudes through hole (6) in body (1), and lip (3) cover the edge of machine foot.

Circular member (2) is now placed into hole (6) in body (1), engaging top of shaft or journal (5) in hole (8), flange (9) supporting circular member (2).

The hole (8) in circular member (2) is off set from its geometric center, forming a major axis. This major axis is set parallel with edge of the machine foot covered by lip (3). The screw (4) in lip (3) is now tightened to contact edge of machine foot.

The circular member (2), being engaged with a mechanical device such as a wrench, at (7) is now rotated, moving the major axis through 90° or a portion thereof, away from contacted edge of machine foot.

The rotational movement is converted into longitudinal movement of the body (1) through circular member (2) engagement in said body (1) in said hole (6), being rotated around an off set fulcrum or hole (8).

The amount of longitudinal body (1) movement is a ratio of the rotation of circular member (2) which can be measured by reading the scale or index (10) against the mark (11) on circular member (2).

The amount of movement envisioned using this tool is the precice amount remaining after initial approximate alignment has been made.

On achieving the desired accurate position the tool is removed, replacing shaft or journal (5) with the securing bolt.

The above description is one preferred embodiment and should not be construed as limitations on the scope of the invention.

What I claim is:

1. A precision moving mechanism for adjusting the position of an object comprising:
   (a) a body having a hole adjacent one end,
   (b) the opposite end of said body having an L-shaped lip edge for contacting a surface of said object,
   (c) a circular member engageable in said body hole having an eccentric means to engage a fulcrum extending through a slot in said object,
   (d) means to rotate said circular member,
   (e) said lip edge restraining movement of said object in one direction opposed to the direction of force applied through rotation of said circular member,
   (f) means for restraining movement of said fulcrum, and
   (g) rotation of said circular member in one direction reducing the distance between said lip edge and said fulcrum to thereby effect positional adjustment of said object.

2. A mechanism as defined in claim 1 wherein said eccentric major axis is initially located in a line parallel to said lip edge.

3. A mechanism as defined in claim 1 for causing precise movement of equipment requiring shaft to shaft alignment wherein said object is a foot or base of said equipment.

* * * * *